(12) United States Patent
Al Jurdi et al.

(10) Patent No.: US 11,664,854 B2
(45) Date of Patent: May 30, 2023

(54) SYSTEM AND METHOD FOR AUGMENTING TRANSMISSION WITH DATA STREAMS FROM TRANSMISSION/RECEPTION POINTS

(71) Applicant: Samsung Electronics Co., Ltd., Suwon-si (KR)

(72) Inventors: Rebal Al Jurdi, Allen, TX (US); Ahmed Atef Ibrahim Ibrahim, Plano, TX (US); Hao Chen, Plano, TX (US); Shiyang Leng, Allen, TX (US); Namjeong Lee, Seoul (KR); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/585,404

(22) Filed: Jan. 26, 2022

(65) Prior Publication Data

US 2022/0376744 A1    Nov. 24, 2022

Related U.S. Application Data

(60) Provisional application No. 63/192,357, filed on May 24, 2021.

(51) Int. Cl.
*H04B 7/024* (2017.01)
*H04B 17/309* (2015.01)
(Continued)

(52) U.S. Cl.
CPC .......... *H04B 7/024* (2013.01); *H04B 17/309* (2015.01); *H04B 17/382* (2015.01); *H04L 1/0003* (2013.01); *H04L 1/0009* (2013.01)

(58) Field of Classification Search
CPC .... H04B 7/024; H04B 17/309; H04B 17/382; H04L 1/0003; H04L 1/0009
See application file for complete search history.

(56) References Cited

U.S. PATENT DOCUMENTS 8,774,850 B2    7/2014   Koo et al.
9,337,906 B2    5/2016   Prasad et al.
(Continued)

FOREIGN PATENT DOCUMENTS

KR    10-2012-0058532 A    6/2012
WO    2020056782 A1    3/2020

OTHER PUBLICATIONS

International Search Report and Written Opinion dated May 30, 2022 regarding Application No. PCT/KR2022/002161, 7 pages.
(Continued)

*Primary Examiner* — Janice N Tieu

(57) ABSTRACT

A method includes obtaining one or more channel quality and performance indicators of a user equipment (UE) from multiple transmit-receive points (TRPs) in a coordinated multipoint (CoMP) cluster. The method also includes generating a set of performance metrics from the one or more channel quality and performance indicators. The method also includes determining a number of helping layers for multiplexing joint transmission (Mux-JT) in the CoMP cluster based on the set of performance metrics. The method also includes selecting a modulation and coding scheme (MCS) for the Mux-JT based on at least one channel quality indicator (CQI) of the UE.

20 Claims, 10 Drawing Sheets

(51) Int. Cl.
*H04L 1/00* (2006.01)
*H04B 17/382* (2015.01)

(56) References Cited

U.S. PATENT DOCUMENTS

| | | | |
|---|---|---|---|
| 11,539,423 B2* | 12/2022 | Kang | H04W 76/19 |
| 2010/0246524 A1* | 9/2010 | Hou | H04B 7/063 |
| | | | 370/329 |
| 2010/0271968 A1 | 10/2010 | Liu et al. | |
| 2012/0140694 A1 | 6/2012 | Sun et al. | |
| 2015/0016295 A1 | 1/2015 | Ebrahimi Tazeh Mahalleh et al. | |
| 2019/0379561 A1 | 12/2019 | Zhang et al. | |
| 2020/0153543 A1 | 5/2020 | Khoshnevisan et al. | |
| 2020/0351892 A1* | 11/2020 | Yi | H04W 80/02 |
| 2022/0014344 A1* | 1/2022 | Zhang | H04W 36/0085 |
| 2022/0116256 A1* | 4/2022 | Shahmohammadian | |
| | | | H04L 5/0048 |
| 2022/0173788 A1* | 6/2022 | Kang | H04B 7/088 |
| 2022/0322457 A1* | 10/2022 | Abdelghaffar | H04L 1/1642 |

OTHER PUBLICATIONS

Määttänen et al., "System-level performance of LTE-Advanced with joint transmission and dynamic point selection schemes", EURASIP Journal on Advances in Signal Processing, No. 247, Nov. 2012, 18 pages.

\* cited by examiner

SYSTEM AND METHOD FOR AUGMENTING TRANSMISSION WITH DATA STREAMS FROM TRANSMISSION/RECEPTION POINTS

CROSS-REFERENCE TO RELATED APPLICATIONS AND CLAIM OF PRIORITY

The present application claims priority to U.S. Provisional Patent Application Ser. No. 63/192,357, filed on May 24, 2021. The content of the above-identified patent document is incorporated herein by reference.

TECHNICAL FIELD

The present disclosure relates generally to wireless communication systems and, more specifically, the present disclosure relates to a system and method for augmenting transmission with data streams from transmission/reception points.

BACKGROUND

Coordinated Multipoint (CoMP) is a suite of techniques introduced in LTE Advanced (3GPP Rel 11) to enhance coverage and throughput particularly at the cell edge. In a legacy cellular network, a UE connects to a single node (e.g., an eNB or gNB), and different nodes perform scheduling and precoding independently. In a CoMP-enabled network, however, the UE connects to multiple nodes, or transmit-receive points (TRPs), forming a CoMP cluster, that collaborate to improve performance by providing diversity or multiplexing gains and interference reduction among other measures.

Joint Transmission (JT) is a CoMP technique where multiple coordinating TRPs transmit streams of data, or layers, to a UE in the same resources. When JT is used, the TRPs can transmit identical data streams to improve the power and quality of the received signal, effectively providing diversity gain. Alternatively, the TRPs can transmit non-identical data streams to enhance the data rate, effectively providing multiplexing gain. This last technique is referred to as Multiplexing Joint Transmission, or Mux-JT for short.

SUMMARY

The present disclosure relates to wireless communication systems and, more specifically, to a system and method for augmenting transmission with data streams from other transmission/reception points.

In one embodiment, a method includes obtaining one or more channel quality and performance indicators of a user equipment (UE) from multiple transmit-receive points (TRPs) in a coordinated multipoint (CoMP) cluster. The method also includes generating a set of performance metrics from the one or more channel quality and performance indicators. The method also includes determining a number of helping layers for multiplexing joint transmission (Mux-JT) in the CoMP cluster based on the set of performance metrics. The method also includes selecting a modulation and coding scheme (MCS) for the Mux-JT based on at least one channel quality indicator (CQI) of the UE.

In another embodiment, a coordinator device includes a memory configured to store instructions. The coordinator device also includes a processor operably connected to the memory. The processor is configured when executing the instructions to: obtain one or more channel quality and performance indicators of a UE from multiple TRPs in a CoMP cluster; generate a set of performance metrics from the one or more channel quality and performance indicators; determine a number of helping layers for Mux-JT in the CoMP cluster based on the set of performance metrics; and select a MCS for the Mux-JT based on at least one CQI of the UE.

In yet another embodiment, a non-transitory computer readable medium includes a plurality of instructions. The plurality of instructions, when executed by at least one processor, is configured to cause the at least one processor to: obtain one or more channel quality and performance indicators of a UE from multiple TRPs in a CoMP cluster; generate a set of performance metrics from the one or more channel quality and performance indicators; determine a number of helping layers for Mux-JT in the CoMP cluster based on the set of performance metrics; and select a MCS for the Mux-JT based on at least one CQI of the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
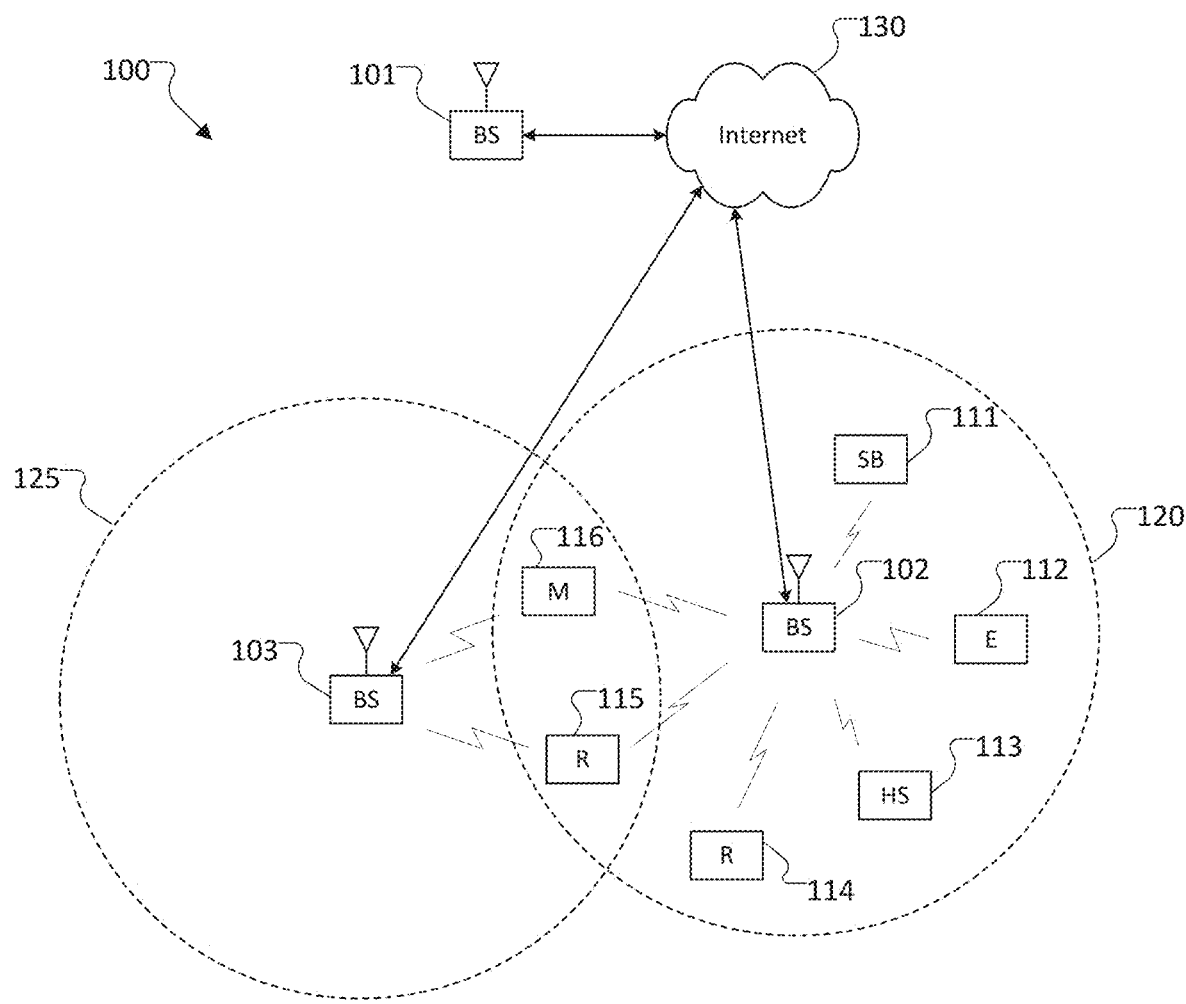
FIG. 1 illustrates an example wireless network according to embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another, or can operate as standalone schemes.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-4B are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), LTE, LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for implementing a system and method for augmenting transmission with data streams from helping transmission/reception points. In certain embodiments, and one or more of the gNBs 101-103 includes circuitry, programming, or a combination thereof for implementing a system and method for augmenting transmission with data streams from helping transmission/reception points.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
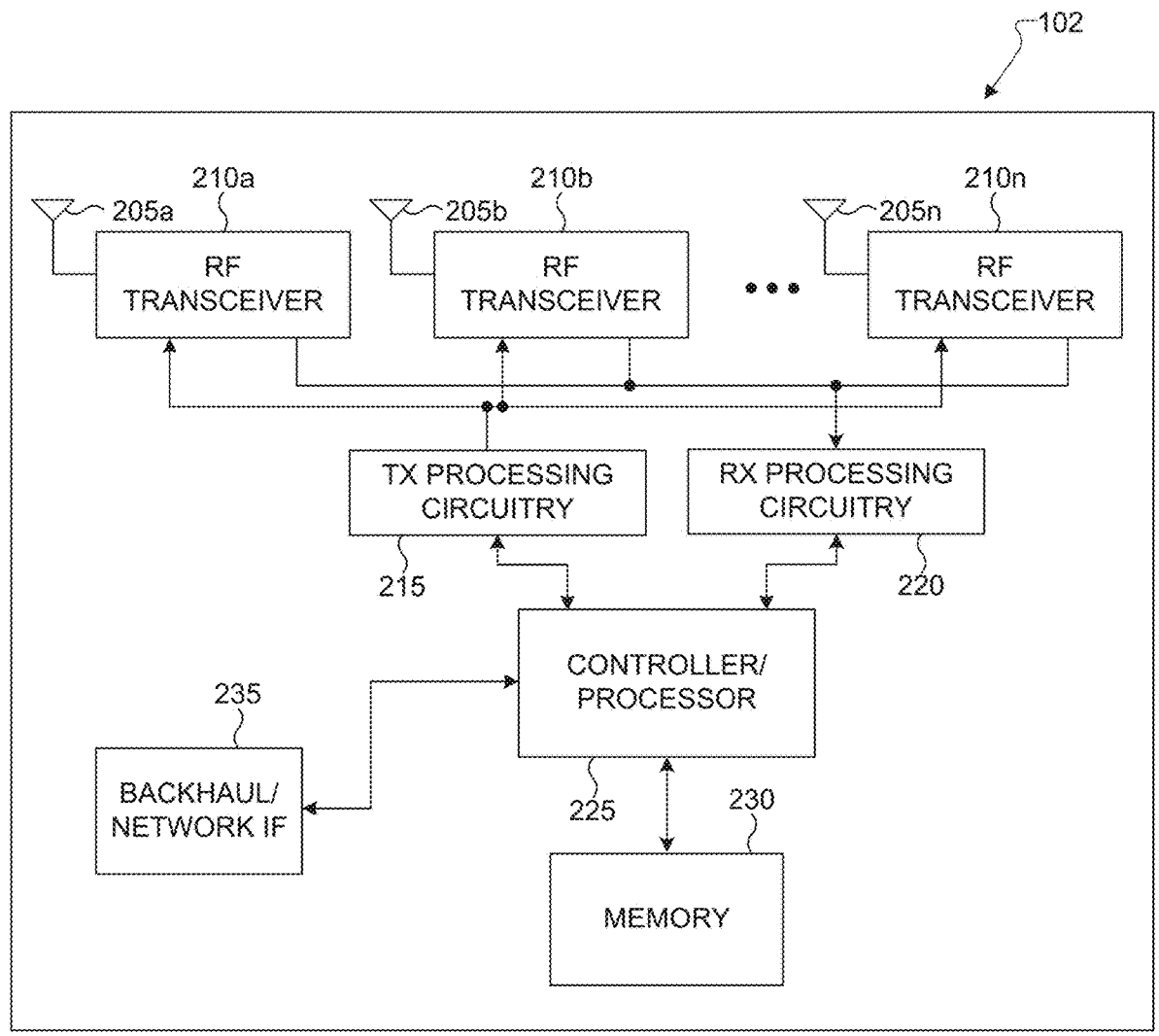
FIG. 2 illustrates an example gNB according to embodiments of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
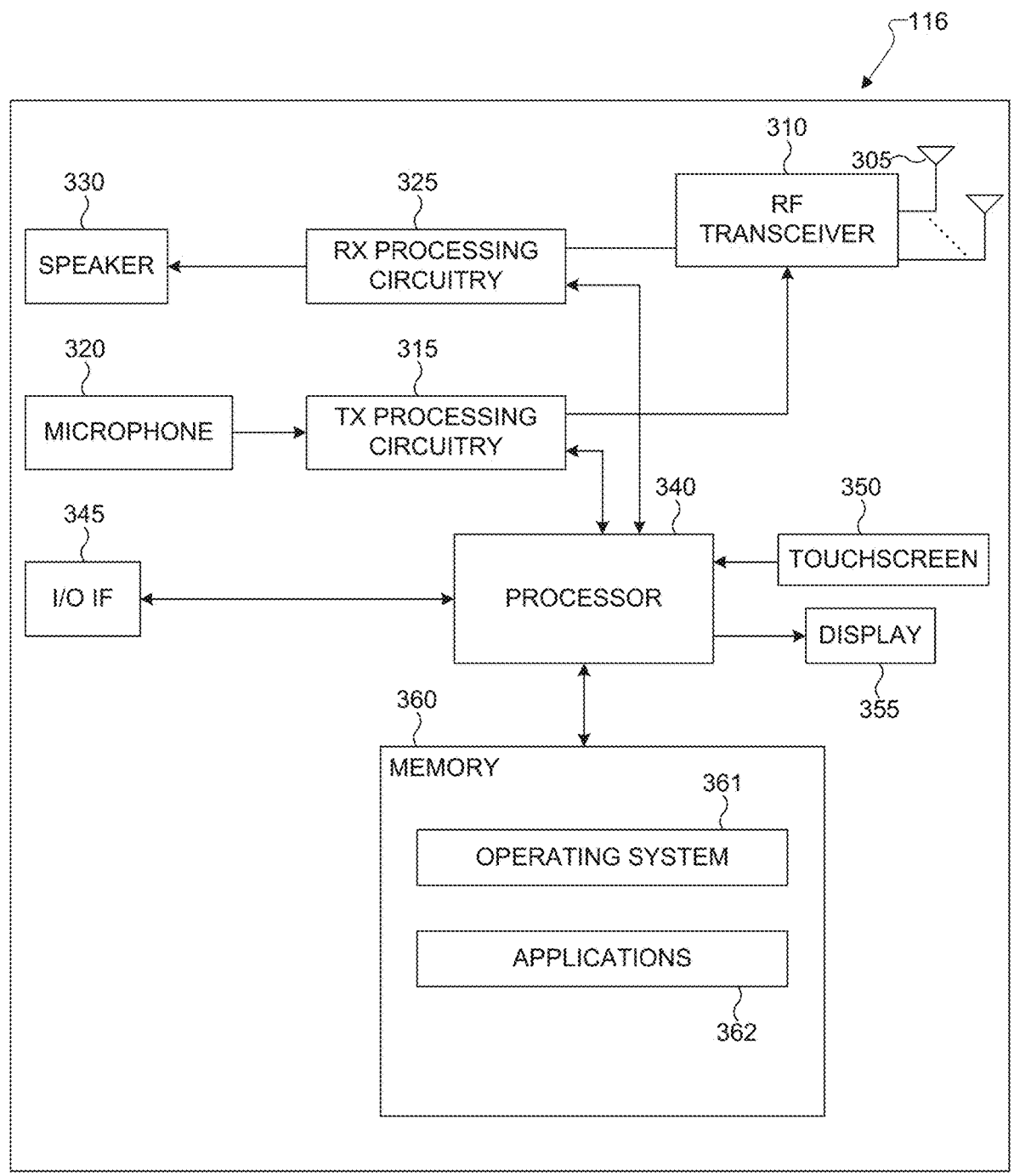
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
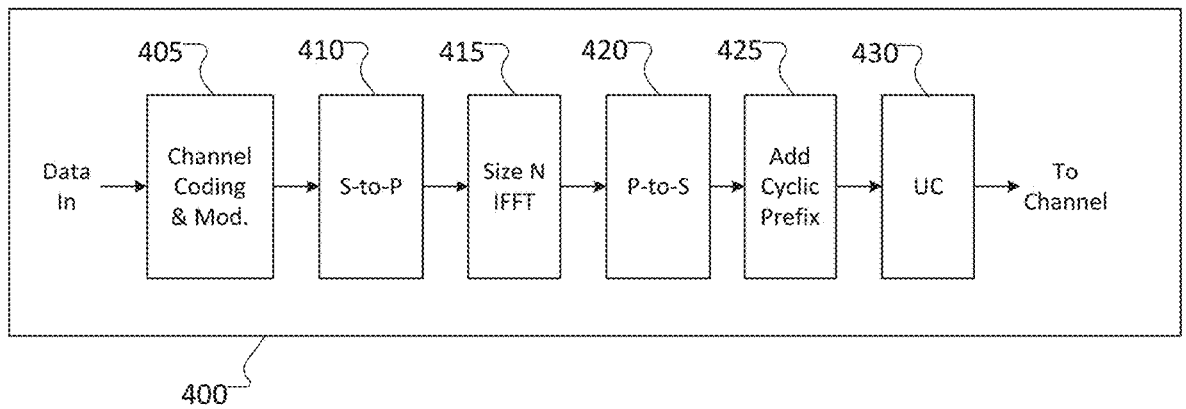
FIG. 4A illustrates a high-level diagram of an orthogonal frequency division multiple access transmit path according to embodiments of the present disclosure.
Figure 4B:
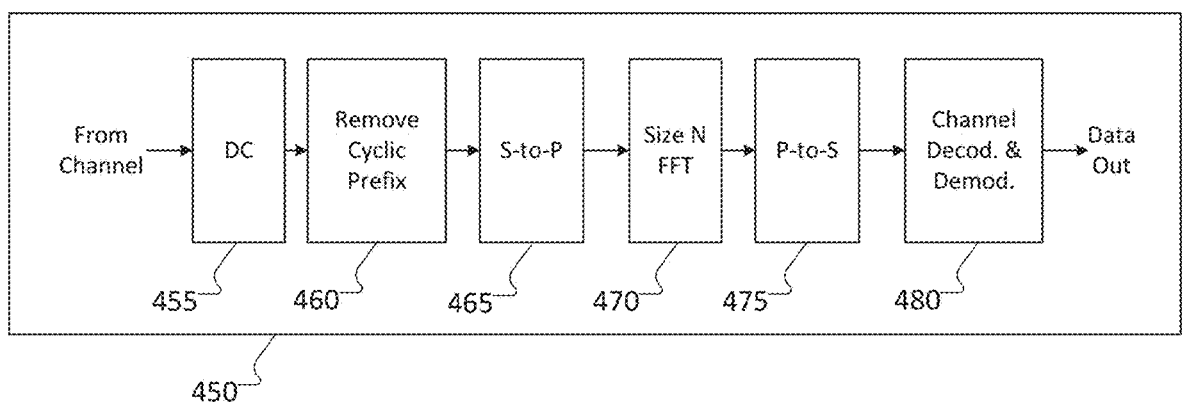
FIG. 4B illustrates a high-level diagram of an orthogonal frequency division multiple access receive path according to embodiments of the present disclosure.

FIG. 4A illustrates a high-level diagram of an orthogonal frequency division multiple access (OFDMA) transmit path 400 according to embodiments of the present disclosure. FIG. 4B illustrates a high-level diagram of an OFDMA receive path 450 according to embodiments of the present disclosure. In FIGS. 4A and 4B, for downlink communication, the transmit path 400 may be implemented in a base station (gNB) 102 or a relay station, and the receive path 450 may be implemented in a user equipment (e.g., user equipment 116 of FIG. 1). In other examples, for uplink communication, the receive path 450 may be implemented in a base station (e.g., gNB 102 of FIG. 1) or a relay station, and the transmit path 400 may be implemented in a user equipment (e.g., user equipment 116 of FIG. 1).

The transmit path 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. The receive path 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In the transmit path 400, the channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. The serial-to-parallel block 410 converts (i.e., de-multiplexes) the serial modulated symbols to parallel data to produce N parallel symbol streams where N is the IFFT/FFT size used in the BS 102 and the UE 116. The Size N IFFT block 415 then performs an IFFT operation on the N parallel symbol streams to produce time-domain output signals. The parallel-to-serial block 420 converts (i.e., multiplexes) the parallel time-domain output symbols from the Size N IFFT block 415 to produce a serial time-domain signal. The add cyclic prefix block 425 then inserts a cyclic prefix to the time-domain signal. Finally, the up-converter 430 modulates (i.e., up-converts) the output of the add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. The down-converter 455 down-converts the received signal to baseband frequency, and the remove cyclic prefix block 460 removes the cyclic prefix to produce the serial time-domain baseband signal. The serial-to-parallel block 465 converts the time-domain baseband signal to parallel time-domain signals. The Size N FFT block 470 then performs an FFT algorithm to produce N parallel frequency-domain signals. The parallel-to-serial block 475 converts the parallel frequency-domain signals to a sequence of modulated data symbols. The channel decoding and demodulation block 480 demodulates and then decodes the modulated symbols to recover the original input data stream.

Each of gNBs 101-103 may implement a transmit path that is analogous to transmitting in the downlink to the UEs 111-116 and may implement a receive path that is analogous to receiving in the uplink from the UEs 111-116. Similarly, each one of the UEs 111-116 may implement a transmit path corresponding to the architecture for transmitting in the uplink to the gNBs 101-103 and may implement a receive path corresponding to the architecture for receiving in the downlink from the gNBs 101-103.

Figure 5:
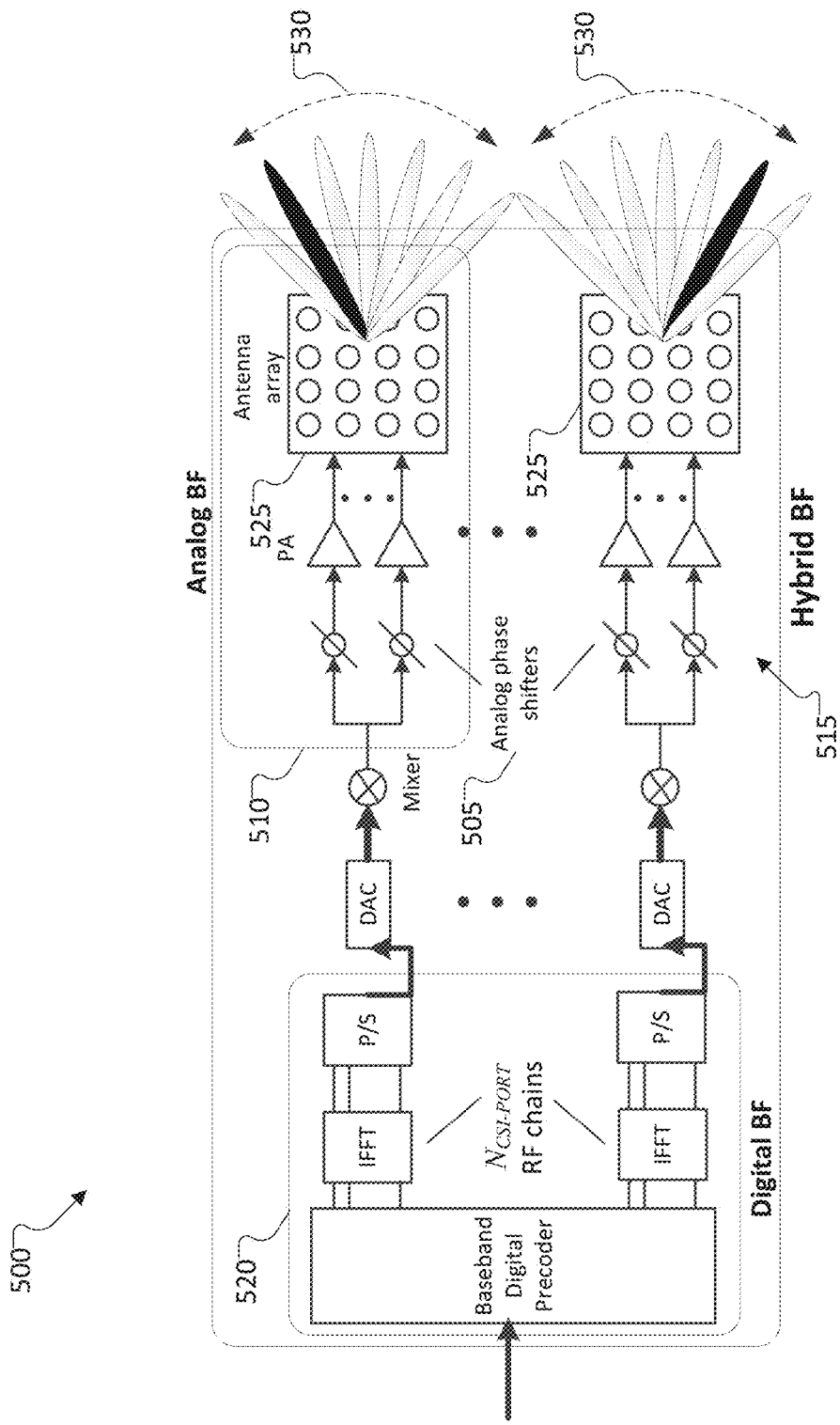
FIG. 5 illustrates an example antenna according to embodiments of the present disclosure.

FIG. 5 illustrates an example beamforming architecture 500 according to embodiments of the present disclosure. The embodiment of the beamforming architecture 500 illustrated in FIG. 5 is for illustration only. FIG. 5 does not limit the scope of this disclosure to any particular implementation of the beamforming architecture 500. In certain embodiments, one or more of gNB 102 or UE 116 can include the beamforming architecture 500. For example, one or more of antenna 205 and its associated systems or antenna 305 and its associated systems can be configured the same as or similar to the beamforming architecture 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs at mmWave frequencies)).

In the example shown in FIG. 5, the beamforming architecture 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports NC SI-PORT. A digital BF 515 performs a linear combination across NCSI-PORT analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the beamforming architecture 500 is also applicable to higher frequency bands such as >52.6 GHz (also termed the FR4). In this case, the beamforming architecture 500 can employ only analog beams. Due to the O2 absorption loss around 60 GHz frequency HO decibels (dB) additional loss @100 m distance), larger number of and sharper analog beams (hence larger number of radiators in the array) will be needed to compensate for the additional path loss.

As discussed above, Joint Transmission (JT) is a CoMP technique where multiple coordinating TRPs transmit streams of data, or layers, to a UE in the same resources. When JT is used, the TRPs can transmit identical data streams to improve the power and quality of the received signal, effectively providing diversity gain. Alternatively, the TRPs can transmit non-identical data streams to enhance the data rate, effectively providing multiplexing gain. This last technique is referred to as Multiplexing Joint Transmission, or Mux-JT for short.

Mux-JT can provide significant rate gains over conventional transmission techniques by augmenting the layers sent by the serving TRP with layers from other TRPs in the CoMP cluster. However, the uneducated augmentation of layers can significantly deteriorate the transmission rate instead of improving it. Therefore, it can be important to use a UE's channel quality and performance, as seen from the perspectives of the cooperating TRPs, as a criterion to trigger Mux-JT.

To address these and other issues, this disclosure provides a system and method for augmenting transmission with data streams from helping TRPs. As described in more detail below, the disclosed embodiments include a coordinating entity that determines whether to trigger Mux-JT by evaluating a number of metrics that are a function of the UE's channel quality and performance indicators as determined by the TRPs of the CoMP cluster. In some embodiments, the coordinating entity determines the UE's eligibility for Mux-JT, obtains indicators of the channel quality and performance of the UE from TRPs in the CoMP cluster, builds a set of metrics, and determines the number of helping layers by successively evaluating and comparing these metrics, one at a time, to a target range of values. Note that while some of the embodiments discussed below are described in the context of use in consumer electronic devices, such as smartphones or tablet computers, these are merely examples. It will be understood that the principles of this disclosure may be implemented in any number of other suitable contexts.

Figure 6:
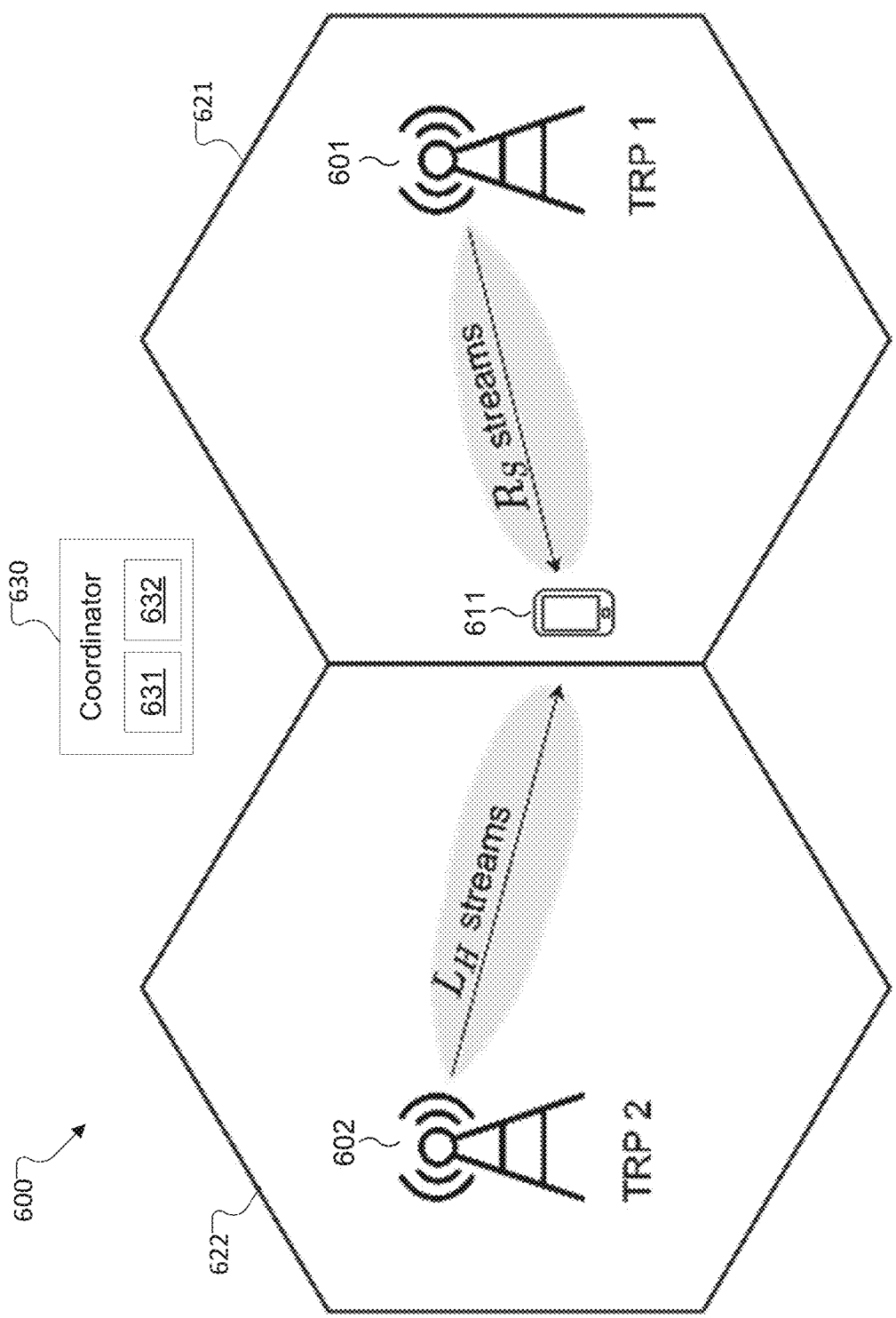
FIG. 6 illustrates an example wireless network in which Mux-JT can be performed according to embodiments of the present disclosure.

FIG. 6 illustrates an example wireless network 600 in which Mux-JT can be performed according to embodiments of the present disclosure. The embodiment of the wireless network 600 shown in FIG. 6 is for illustration only. Other embodiments of the wireless network 600 could be used without departing from the scope of this disclosure.

As shown in FIG. 6, the wireless network 600 includes two TRPs 601-602 and a UE 611. The TRPs 601-602 are gNBs and can represent (or be represented by) one or more of the gNBs 101-103 of FIG. 1. Each TRP 601-602 has a corresponding coverage area 621-622. The coverage areas 621-622 can form a CoMP cluster for performing CoMP. The UE 611 can represent (or be represented by) one or more of the UEs 111-116 of FIG. 1.

In legacy (i.e., non Mux-JT) transmission, a UE is served with streams of data by a single TRP. The TRP is referred to as the serving TRP, and the UE is referred to as the served UE. In Mux-JT in the wireless network 600, the UE 611 is served by multiple TRPs—the TRP 601 and the TRP 602—with non-identical streams of data, $R_S$ and $L_H$. As Mux-JT is a CoMP operation, the transmission is performed by TRPs of the same CoMP cluster. The roles of the multiple TRPs 601-602 performing Mux-JT are distinguished through the following terminology. The TRP 601, which the UE 611 associates with, is referred to as the serving TRP. The TRP 602, which contributes to Mux-JT, is referred to as a helping TRP.

The TRPs 601-602 forming the CoMP cluster share information about the UE 611 to be used by the serving TRP 601 to decide whether to perform legacy transmission or Mux-JT. This information can include the channel state information (CSI) between the UE 611 and the TRPs 601-602, which includes the Channel Quality Indicator (CQI) and Rank Indicator (RI) obtained in the feedback report sent by the UE 611 to each TRP 601-602 that requests one. The shared information can also include the Precoding Matrix Indicator (PMI) when PMI precoding is used, and the Sounding Reference Signal (SRS) transmitted by the UE 611 and measured by every TRP 601-602 when SRS precoding is used. Other information can include channel quality indicators such as the Reference Signal Received Power (RSRP) and Reference Signal Received Quality (RSRQ) for every TRP-UE channel. Still other information can include performance indicators such as data rate, block error rate (BLER), code rate, modulation order, the number of retransmissions, and the like.

The information that is shared among the TRPs 601-602 can be instantaneous, averaged over a finite history, or averaged over the entire history. In some embodiments, the shared information can also be a statistic of a time series of a channel quality and performance indicator, such as the median or other percentile. In this disclosure, the variable $x_t$ is defined as the channel quality and performance of the UE 611 as measured by TRP t, where t=1 is reserved for the serving TRP 601. For example, $x_1$ can include the CQI in the feedback report requested by the serving TRP 601, the SRS power as computed by the serving TRP 601, and the moving average of the data rate for the UE 611.

The task of deciding whether to perform legacy transmission or Mux-JT can be performed by a coordinator 630 that has access to the channel quality and performance information $\{x_t\}_{t=1}^T$ that is determined by the T TRPs 601-602 of the CoMP cluster. The coordinator 630 can be the serving TRP 601, a device or entity residing therein, or a device or entity that is physically separated from the TRP 601. In some embodiments, the coordinator 630 is a computing device (e.g., a server) that includes one or more processors 631 or other processing devices that control the overall operation of the coordinator 630. Each processor 631 is capable of executing programs and other processes resident in a memory 632, such as an OS. Each processor 631 can move data into or out of the memory 632 as required by an executing process. The coordinator 630 can implement one or more algorithms, processes, or techniques to determine whether to perform legacy transmission or Mux-JT, as described in greater detail below.

Although FIG. 6 illustrates one example of a wireless network 600 in which Mux-JT can be performed, various changes may be made to FIG. 6. For example, other numbers of TRPs, coverage areas, and UEs could be included in the wireless network 600. Also, various components in FIG. 6 could be combined, further subdivided, or omitted and additional components could be added according to particular needs.

Figure 7:
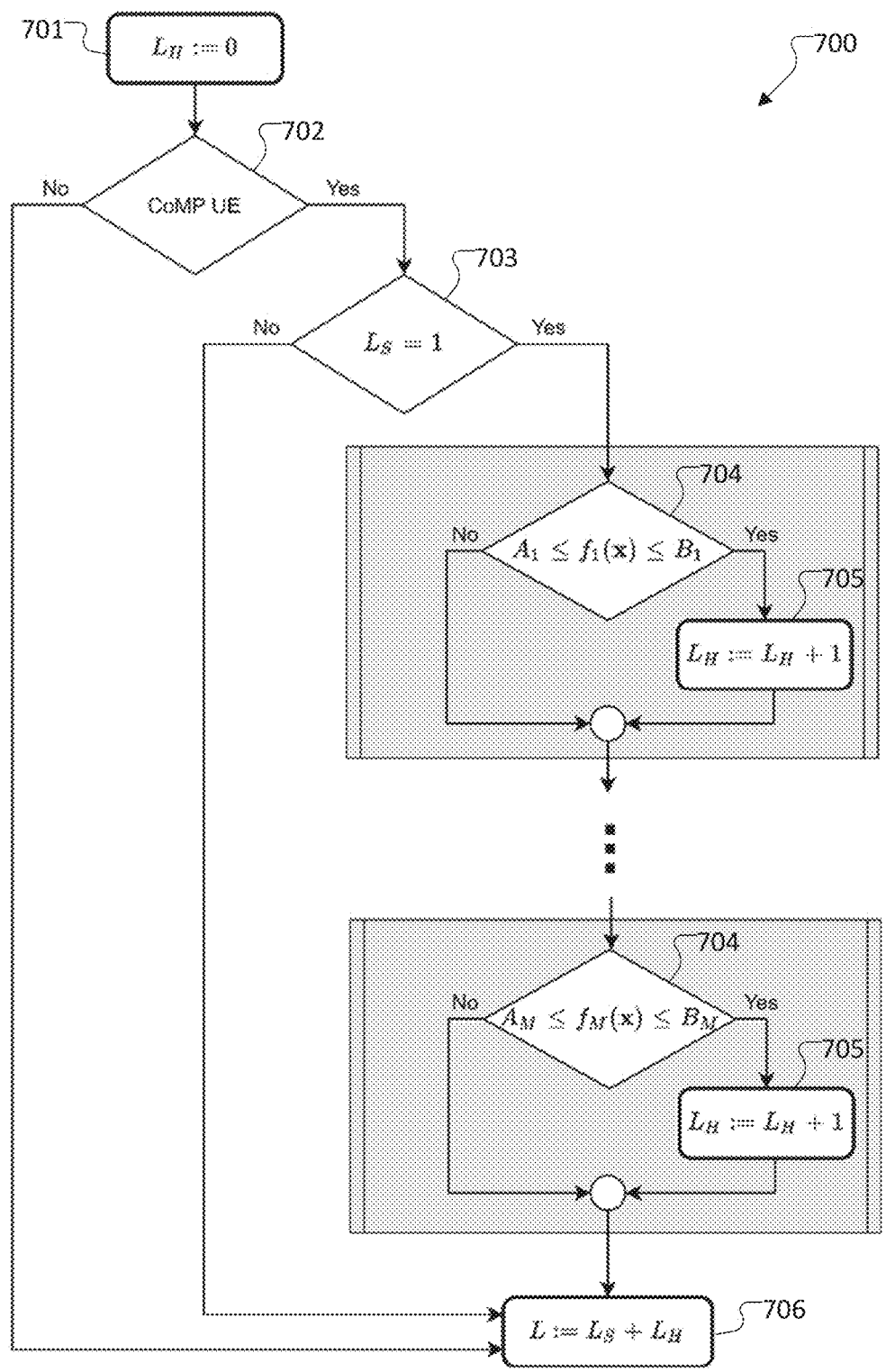
FIGS. 7 through 9 illustrate details of different example processes for augmenting transmission with data streams from helping TRPs according to embodiments of the present disclosure.

FIG. 7 illustrates details of an example process 700 for augmenting transmission with data streams from helping TRPs according to embodiments of the present disclosure. The embodiment of the process 700 shown in FIG. 7 is for illustration only. Other embodiments of the process 700 could be used without departing from the scope of this disclosure.

As shown in FIG. 7, the process 700 includes multiple operations that can be performed by one or more coordinators in a CoMP cluster. For ease of explanation, the process 700 will be described as being performed by the coordinator 630 of the wireless network 600. In the following description, the network 600 will be referred to as a CoMP cluster 600. In the process 700, the number of serving layers $L_S$ refers to the number of layers to be transmitted by the serving TRP 601, and the number of helping layers $L_H$ refers to the number of layers to be sent by the helping TRP 602.

At operation 701, the number of helping layers $L_H$ is initialized to zero.

At operation 702, the coordinator 630 determines if the UE 611 is a CoMP UE, i.e., a UE that is suitable for a CoMP operation. To determine if the UE 611 is a CoMP UE, the coordinator 630 defines and evaluates an eligibility metric $g(x_1, \ldots, x_T)$ that is a function of multiple channel quality and performance parameters $\{x_t\}_{t=1}^T$. Here, T represents the number of channel quality and performance parameters that are evaluated. The coordinator 630 compares the value of the eligibility metric against a reference set of acceptable values. In one example, T=2 and $g(x_1, x_2)$ is the difference of CQI values of the feedback reports obtained by the serving TRP 601 and the helping TRP 602. In another example, $g(x_1, \ldots, x_T)$ is the standard deviation of the SRS power as determined by the T TRPs. In yet another example, $g(x_1, x_2 \ldots, x_T) = g(x_1, \emptyset, \ldots, \emptyset)$ is the RSRQ of the UE 611 as measured by the serving TRP 601 alone. After determining the eligibility metric g, the coordinator 630 compares the value of the eligibility metric against a predetermined range of acceptable reference values and determines whether the UE 611 is eligible for a CoMP operation, i.e., Mux-JT. For example, if the eligibility metric is within the range of acceptable values, then the coordinator 630 can determine that the UE 611 is eligible for Mux-JT.

At operation 703, the coordinator 630 determines the number of serving layers $L_S$. The number of serving layers can be equal to the RI that is reported by the UE 611 to the serving TRP 601. Alternatively, the number of serving layers can be determined from the multi-layer SRS channel if the UE 611 supports Transmit Antenna Switching (TAS). If $L_S=1$, the process 700 continues to operation 704, where the coordinator 630 determines the number of helping layers $L_H$. Otherwise, if $L_S \neq 1$, the coordinator 630 determines that no helping TRP should contribute streams of data, and that effectively legacy transmission should be performed. In some embodiments, the coordinator 630 need not perform Mux-JT only when $L_S=1$, but rather allow Mux-JT even when $L_S>1$.

At operation 704, the coordinator 630 computes a set of M performance metrics $\{f_m(x)\}_{m=1}^M$. Each performance metric is a function of the UE 611's channel quality and performance indicators as determined by the helping TRP 602 in the CoMP cluster. Here $x=(x_1, \ldots, x_T)$. For example, one performance metric $f_1(x)$ can be chosen to be the instantaneous feedback CQI the UE 611 reports to the serving TRP 601; another performance metric $f_2(x)$ can be the moving average of the UE 611's BLER. Having defined M performance metrics, the coordinator 630 allows for a maximum of M helping layers. The coordinator 630 determines the number of helping layers by successively comparing the performance metrics, one at a time, to a target range of values $A_m$ and $B_m$. At operation 705, the coordinator 630 increments $L_H$ by one (i.e., adds a layer) every time a performance metric falls within its target range, i.e., if $A_m < f_m(x) < B_m$. Acceptable values for $A_m$ and $B_m$ for each performance metric $f_m(x)$ can be determined empirically, e.g., via simulation.

At operation 706, the coordinator 630 sets the total number of layers L as the sum of the number of serving layers $L_S$ and the number of helping layers $L_H$. The layers L can be used during Mux-JT.

Although FIG. 7 illustrates one example of a process 700 for augmenting transmission with data streams from helping TRPs, various changes may be made to FIG. 7. For example, while the process 700 is described as involving only one helping TRP that helps only one UE, other embodiments could include more than one helping TRP or UE. Also, while shown as a series of steps, various steps in FIG. 7 could overlap, occur in parallel, occur in a different order, or occur any number of times.

Figure 8:
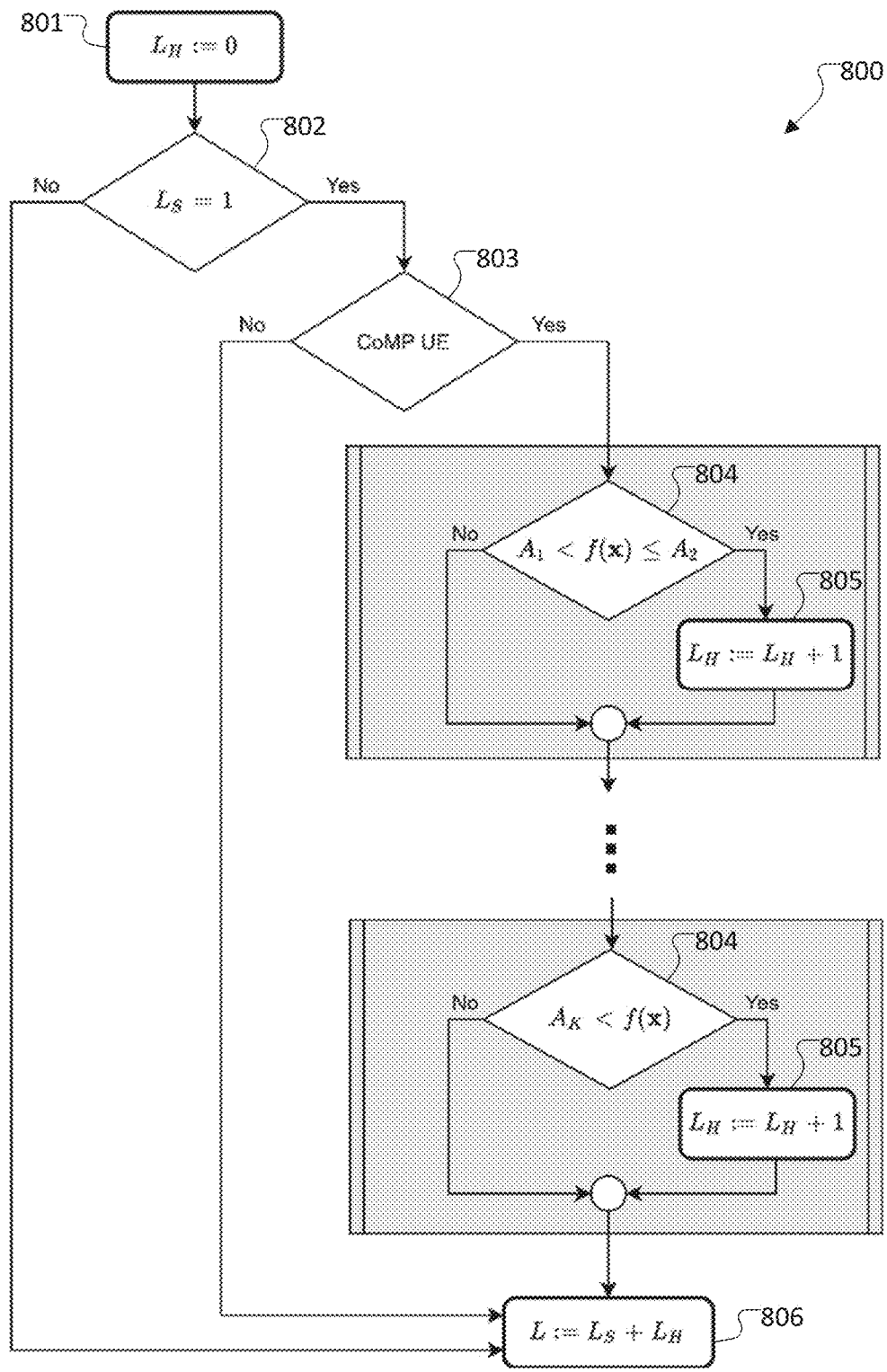

FIG. 8 illustrates details of another example process 800 for augmenting transmission with data streams from helping TRPs according to embodiments of the present disclosure. The embodiment of the process 800 shown in FIG. 8 is for illustration only. Other embodiments of the process 800 could be used without departing from the scope of this disclosure.

As shown in FIG. 8, the process 800 includes multiple operations that can be performed by one or more coordinators in a CoMP cluster. Some of the operations are the same as, or similar to, corresponding operations of the process 700. For ease of explanation, the process 800 will be described as being performed by the coordinator 630 of the wireless network 600, also referred to as the CoMP cluster 600.

At operation 801, the number of helping layers $L_H$ is initialized to zero.

At operation 802, the coordinator 630 determines if the UE 611 is a CoMP UE, i.e., a UE that is suitable for a CoMP operation. The operation 802 can be the same as, or similar to, the operation 702, in which the coordinator 630 defines and evaluates an eligibility metric $g(x_1, \ldots, x_T)$, compares the value of the eligibility metric against a predetermined range of acceptable reference values, and determines whether the UE 611 is eligible for Mux-JT.

At operation 803, the coordinator 630 determines the number of serving layers $L_S$. The operation 803 can be the same as, or similar to, the operation 703, in which the number of serving layers can be equal to the RI that is reported by the UE 611 to the serving TRP 601, or the number of serving layers can be determined from the multi-layer SRS channel if the UE 611 supports TAS. If $L_S=1$, the process 800 continues to operation 804, where the coordinator 630 determines the number of helping layers $L_H$. Otherwise, if $L_S \neq 1$, the coordinator 630 determines that no helping TRP should contribute streams of data, and that effectively legacy transmission should be performed. In some embodiments, the coordinator 630 need not perform Mux-JT only when $L_S=1$, but rather allow Mux-JT even when $L_S>1$.

At operations 804 and 805, the coordinator 630 computes the number of helping layers $L_H$ by framing a single performance metric f(x) between successive steps of a ladder of target values. In the example shown in FIG. 8, there is a total of K steps. In particular, the coordinator 630 defines and evaluates the performance metric f(x), which can be the CQI that the UE 611 feeds back to the serving TRP 601. The performance metric f(x) is then framed between successive steps of a ladder of target values $\{A_1, A_2, \ldots, A_K\}$. Acceptable values for the target values $\{A_1, A_2, \ldots, A_K\}$ can be determined empirically. Steps toward the top end of the ladder favor the addition of more helping layers, and steps toward the bottom favor the addition of fewer helping layers. The performance metric f(x) need not be the CQI reported by the UE 611 to the serving TRP 601. Instead, the performance metric f(x) can be the arithmetic mean of the CQI the UE 611 reports to the serving TRP 601 and the CQI the UE 611 reports to the helping TRP 602, the arithmetic mean of the RIs reported to the TRPs 601-602, or other simple or hybrid metrics that indicate benefit in adding layers. If the performance metric f(x) is taken to be the feedback CQI, the coordinator 630 frames its value in a ladder that can start at 5 dB with steps of 10 dB. Of course, these values are merely examples; other combinations of values are possible and within the scope of this disclosure. The higher the CQI, the more layers the coordinator 630 chooses to augment from the serving TRP 601.

At operation 806, the coordinator 630 sets the total number of layers L as the sum of the number of serving layers $L_S$ and the number of helping layers $L_H$. The layers L can be used during Mux-JT.

Although FIG. 8 illustrates one example of a process 800 for augmenting transmission with data streams from helping TRPs, various changes may be made to FIG. 8. For example, while the process 800 is described as involving only one helping TRP that helps only one UE, other embodiments could include more than one helping TRP or UE. Also, while shown as a series of steps, various steps in FIG. 8 could overlap, occur in parallel, occur in a different order, or occur any number of times.

Figure 9:
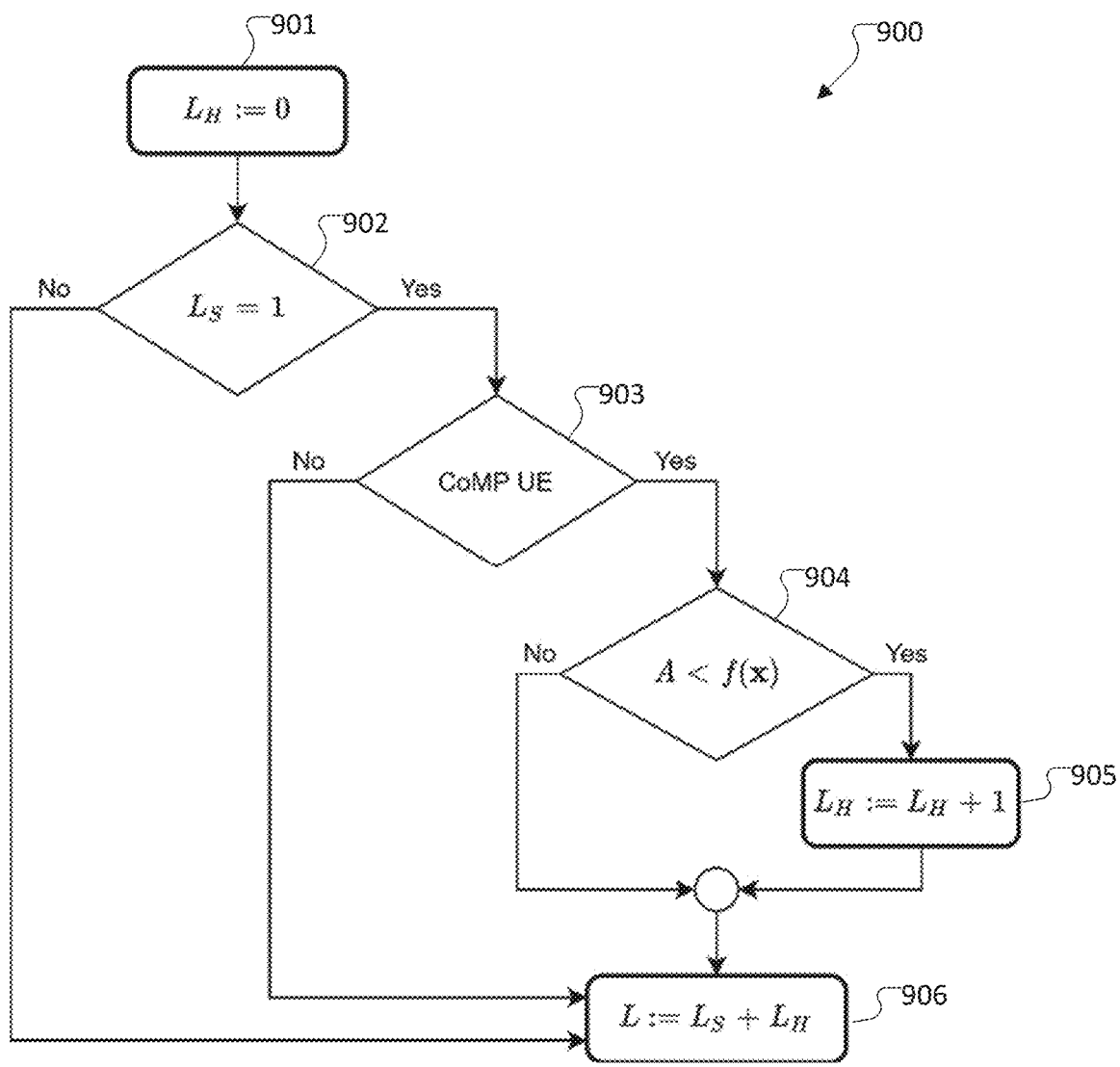

FIG. 9 illustrates details of yet another example process 900 for augmenting transmission with data streams from helping TRPs according to embodiments of the present disclosure. The embodiment of the process 900 shown in FIG. 9 is for illustration only. Other embodiments of the process 900 could be used without departing from the scope of this disclosure.

As shown in FIG. 9, the process 900 includes multiple operations that can be performed by one or more coordinators in a CoMP cluster. Some of the operations are the same as, or similar to, corresponding operations of the process 700. For ease of explanation, the process 900 will be described as being performed by the coordinator 630 of the wireless network 600, also referred to as the CoMP cluster 600.

At operation 901, the number of helping layers $L_H$ is initialized to zero.

At operation 902, the coordinator 630 determines if the UE 611 is a CoMP UE, i.e., a UE that is suitable for a CoMP operation. The operation 902 can be the same as, or similar to, the operation 702, in which the coordinator 630 defines and evaluates an eligibility metric $g(x_1, \ldots, x_T)$, compares the value of the eligibility metric against a predetermined range of acceptable reference values, and determines whether the UE 611 is eligible for Mux-JT.

At operation 903, the coordinator 630 determines the number of serving layers $L_S$. The operation 903 can be the same as, or similar to, the operation 703, in which the number of serving layers can be equal to the RI that is reported by the UE 611 to the serving TRP 601, or the number of serving layers can be determined from the multi-layer SRS channel if the UE 611 supports TAS. If $L_S=1$, the process 900 continues to operation 904, where the coordinator 630 determines the number of helping layers $L_H$. Otherwise, if $L_S \neq 1$, the coordinator 630 determines that no helping TRP should contribute streams of data, and that effectively legacy transmission should be performed.

At operations 904 and 905, the coordinator 630 determines the number of helping layers $L_H$ by comparing a single performance metric f (x) to a single threshold. In particular, the coordinator 630 defines and evaluates the performance metric f (x), which can be the CQI that the UE 611 feeds back to the serving TRP 601, or a channel quality or performance indicator determined by a TRP 601-602, or a combination of these. The performance metric f (x) is then compared to a predetermined threshold value A. In some embodiments, the threshold value A may be a passing threshold, e.g., 5-15 dB. If the performance metric f (x) is greater than the threshold value A, then the coordinator 630 increments $L_H$ by one, i.e., adds a layer. As shown in FIG. 9, the process 900 restricts the augmentation of helping layers to a single layer from the helping TRP 602. That is, the coordinator 630 makes a one-step decision to perform Mux-JT by comparing the performance metric f (x) to a threshold.

At operation 906, the coordinator 630 sets the total number of layers L as the sum of the number of serving layers $L_S$ and the number of helping layers $L_H$. The layers L can be used during Mux-JT.

Although FIG. 9 illustrates one example of a process 900 for augmenting transmission with data streams from helping TRPs, various changes may be made to FIG. 9. For example, while the process 900 is described as involving only one helping TRP that helps only one UE, other embodiments could include more than one helping TRP or UE. Also, while shown as a series of steps, various steps in FIG. 9 could overlap, occur in parallel, occur in a different order, or occur any number of times.

Selection of Modulation and Coding Scheme

In some embodiments, selecting the appropriate Modulation and Coding Scheme (MCS) is very important when performing Mux-JT. In legacy transmission, the serving TRP determines the MCS that is commensurate with the channel between the served UE and the serving TRP. The TRP computes the MCS as a function of a CQI such as the feedback CQI. With Mux-JT, however, the different data streams transmitted by the coordinating TRPs observe different channels. Single-codeword (CW) transmission thus entails the use of an MCS that is supported by the different channels linking the UE to the TRPs. Too high of an MCS would lead to many errors. Too low of an MCS would tie down the rate. The following describes different techniques for the coordinator to select the MCS according to various embodiments.

In one example, the network allows a CoMP cluster set with a maximum size of two, meaning that there are two TRPs in the CoMP cluster: one serving TRP from the perspective of a UE and one helping TRP (such as the CoMP cluster shown in FIG. 6). Additionally, the TRPs use a single codeword for the multi-layer transmission. The coordinator (e.g., the coordinator 630) can combine, in different ways, the CQIs reported by the UE to the two TRPs to determine the MCS:

Minimum CQI: The smaller of the CQI reported to the serving TRP and the CQI reported to the helping TRP is used to determine the MCS.

Maximum CQI: The larger of the CQI reported to the serving TRP and the CQI reported to the helping TRP is used to determine the MCS.

Serving CQI: The CQI reported to the serving TRP is used.

Layer-weighted CQI: The CQIs $C_S$ and $C_H$ reported to the serving TRP and the helping TRP, respectively, are weighted by the number of serving and helping layers and normalized by the total number, as represented by the following:

$$C = \frac{L_S C_S + L_H C_H}{L_S + L_H}$$

Rank-weighted CQI: The CQIs $C_S$ and $C_H$ are weighted by the ranks $R_S$ and $R_H$ reported to the serving TRP and the helping TRP, respectively, and normalized by the total number of layers, as represented by the following:

$$C = \frac{R_S C_S + R_H C_H}{L_S + L_H}$$

Effective Exponential Signal-to-Noise Ratio Mapping (EESM) averaging of the CQIs reported to the serving TRP and the helping TRP.

Figure 10:
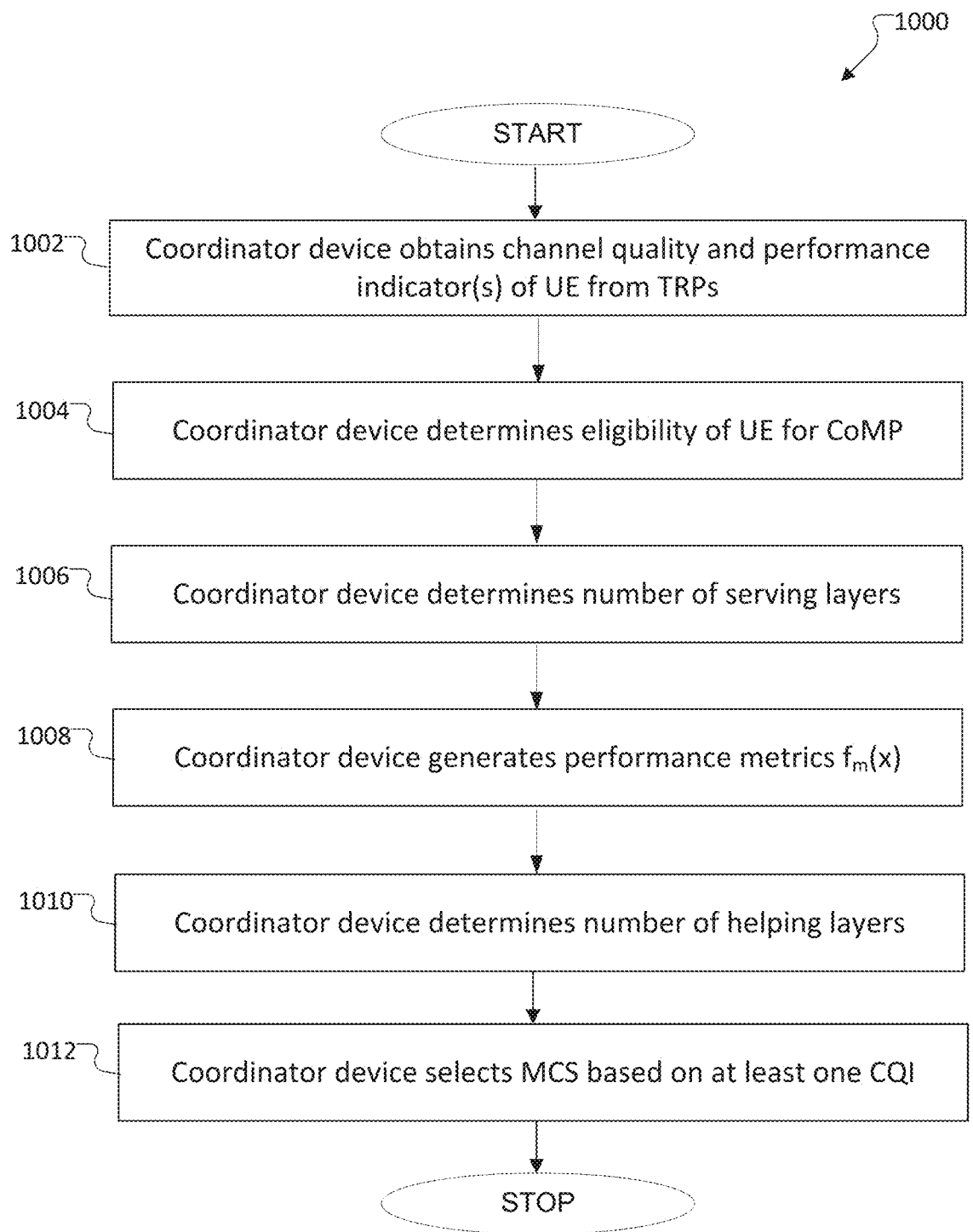
FIG. 10 illustrates a flow chart of a method for augmenting transmission with data streams from helping TRPs according to embodiments of the present disclosure.

FIG. 10 illustrates a flow chart of a method 1000 for augmenting transmission with data streams from helping TRPs according to embodiments of the present disclosure, as may be performed by a coordinator device (e.g., the coordinator 630 as illustrated in FIG. 6). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, the method 1000 begins at step 1002. At step 1002, a coordinator device obtains one or more channel quality and performance indicators of a UE from multiple TRPs in a CoMP cluster. This could include, for example, the coordinator 630 obtaining one or more channel quality and performance indicators of the UE 611 (e.g., CQI, RI, PMI, SRS, RSRP, RSRQ, data rate, BLER, code rate, modulation order, the number of retransmissions, and the like) from the TRPs 601-602.

At step 1004, the coordinator device determines eligibility of the UE for CoMP communication based on at least one of the one or more channel quality and performance indicators. This could include, for example, the coordinator 630 performing operation 702 to determine the eligibility of the UE 611 for CoMP communication.

At step 1006, the coordinator device determines a number of serving layers for Mux-JT in the CoMP cluster. This could include, for example, the coordinator 630 performing operation 703 to determine the number of serving layers $L_S$.

At step 1008, the coordinator device generates a set of performance metrics from the one or more channel quality and performance indicators. This could include, for example, the coordinator 630 performing operation 704 to compute the set of M performance metrics $\{f_m(x)\}_{m=1}^{M}$.

At step 1010, the coordinator device determines a number of helping layers for Mux-JT in the CoMP cluster based on the set of performance metrics. This could include, for example, the coordinator 630 performing operations 704 and 705 to determine the number of helping layers $L_H$.

At step 1012, the coordinator device selects a MCS for the Mux-JT based on at least one CQI of the UE. This could include, for example, the coordinator 630 selecting the MCS based on one or more of maximum CQI, minimum CQI, serving CQI, layer-weighted CQI, rank-weighted CQI, or EESM averaging of the CQIs.

Although FIG. 10 illustrates one example of a method 1000 for augmenting transmission with data streams from helping TRPs, various changes may be made to FIG. 10. For example, while shown as a series of steps, various steps in FIG. 10 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
    obtaining one or more channel quality and performance indicators of a user equipment (UE) from multiple transmit-receive points (TRPs) in a coordinated multi-point (CoMP) cluster;
    generating a set of performance metrics from the one or more channel quality and performance indicators;
    determining a number of helping layers for multiplexing joint transmission (Mux-JT) in the CoMP cluster based on the set of performance metrics; and
    selecting a modulation and coding scheme (MCS) for the Mux-JT based on at least one channel quality indicator (CQI) of the UE.

2. The method of claim 1, wherein determining the number of helping layers for the Mux-JT based on the set of performance metrics comprises:
    successively evaluating and comparing the performance metrics, one at a time, to a target range of values; and
    incrementing the number of helping layers for each of the performance metrics that is within the target range of values.

3. The method of claim 1, further comprising:
    determining a number of serving layers for the Mux-JT, wherein the number of helping layers is determined based in part on the number of serving layers.

4. The method of claim 1, further comprising:
    determining eligibility of the UE for CoMP communication based on at least one of the one or more channel quality and performance indicators.

5. The method of claim 4, wherein determining the eligibility of the UE for CoMP communication comprises:
    generating an eligibility metric based on the at least one channel quality and performance indicator; and
    comparing the eligibility metric to a range of acceptable values to determine the eligibility of the UE.

6. The method of claim 1, wherein the at least one CQI comprises a serving CQI and a helping CQI.

7. The method of claim 1, wherein one or more performance metrics comprises at least one of: a helping channel quality indicator (CQI) of the UE, a serving CQI of the UE, a variance of sounding reference signal (SRS) power, and a Reference Signal Received Quality (RSRQ).

8. A coordinator device comprising:
    a memory configured to store instructions; and
    a processor operably connected to the memory, the processor configured when executing the instructions to:
        obtain one or more channel quality and performance indicators of a user equipment (UE) from multiple transmit-receive points (TRPs) in a coordinated multipoint (CoMP) cluster;
        generate a set of performance metrics from the one or more channel quality and performance indicators;
        determine a number of helping layers for multiplexing joint transmission (Mux-JT) in the CoMP cluster based on the set of performance metrics; and
        select a modulation and coding scheme (MCS) for the Mux-JT based on at least one channel quality indicator (CQI) of the UE.

9. The coordinator device of claim 8, wherein to determine the number of helping layers for the Mux-JT based on the set of performance metrics, the processor is configured to:
    successively evaluate and comparing the performance metrics, one at a time, to a target range of values; and increment the number of helping layers for each of the performance metrics that is within the target range of values.

10. The coordinator device of claim 8, wherein the processor is further configured to:
   determine a number of serving layers for the Mux-JT, wherein the number of helping layers is determined based in part on the number of serving layers.

11. The coordinator device of claim 8, wherein the processor is further configured to:
   determine eligibility of the UE for CoMP communication based on at least one of the one or more channel quality and performance indicators.

12. The coordinator device of claim 11, wherein to determine the eligibility of the UE for CoMP communication, the processor is configured to:
   generate an eligibility metric based on the at least one channel quality and performance indicator; and
   compare the eligibility metric to a range of acceptable values to determine the eligibility of the UE.

13. The coordinator device of claim 8, wherein the at least one CQI comprises a serving CQI and a helping CQI.

14. The coordinator device of claim 8, wherein one or more performance metrics comprises at least one of: a helping channel quality indicator (CQI) of the UE, a serving CQI of the UE, a variance of sounding reference signal (SRS) power, and a Reference Signal Received Quality (RSRQ).

15. A non-transitory computer readable medium comprising a plurality of instructions that, when executed by at least one processor, is configured to cause the at least one processor to:
   obtain one or more channel quality and performance indicators of a user equipment (UE) from multiple transmit-receive points (TRPs) in a coordinated multi-point (CoMP) cluster;
   generate a set of performance metrics from the one or more channel quality and performance indicators;
   determine a number of helping layers for multiplexing joint transmission (Mux-JT) in the CoMP cluster based on the set of performance metrics; and
   select a modulation and coding scheme (MCS) for the Mux-JT based on at least one channel quality indicator (CQI) of the UE.

16. The non-transitory computer readable medium of claim 15, wherein to determine the number of helping layers for the Mux-JT based on the set of performance metrics, the plurality of instructions is configured to cause the at least one processor to:
   successively evaluate and comparing the performance metrics, one at a time, to a target range of values; and
   increment the number of helping layers for each of the performance metrics that is within the target range of values.

17. The non-transitory computer readable medium of claim 15, wherein the plurality of instructions is further configured to cause the at least one processor to:
   determine a number of serving layers for the Mux-JT, wherein the number of helping layers is determined based in part on the number of serving layers.

18. The non-transitory computer readable medium of claim 15, wherein the plurality of instructions is further configured to cause the at least one processor to:
   determine eligibility of the UE for CoMP communication based on at least one of the one or more channel quality and performance indicators.

19. The non-transitory computer readable medium of claim 18, wherein to determine the eligibility of the UE for CoMP communication, the plurality of instructions is configured to cause the at least one processor to:
   generate an eligibility metric based on the at least one channel quality and performance indicator; and
   compare the eligibility metric to a range of acceptable values to determine the eligibility of the UE.

20. The non-transitory computer readable medium of claim 15, wherein the at least one CQI comprises a serving CQI and a helping CQI.

* * * * *